P. ROCH & E. CHALLET.
SET-OFF SQUARE,
APPLICATION FILED MAY 10, 1910.
980,340.
Patented Jan. 3, 1911.
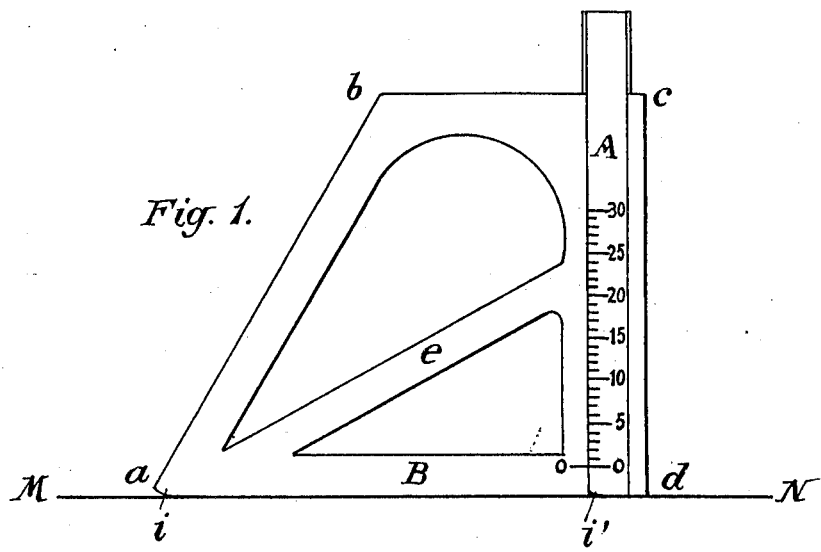
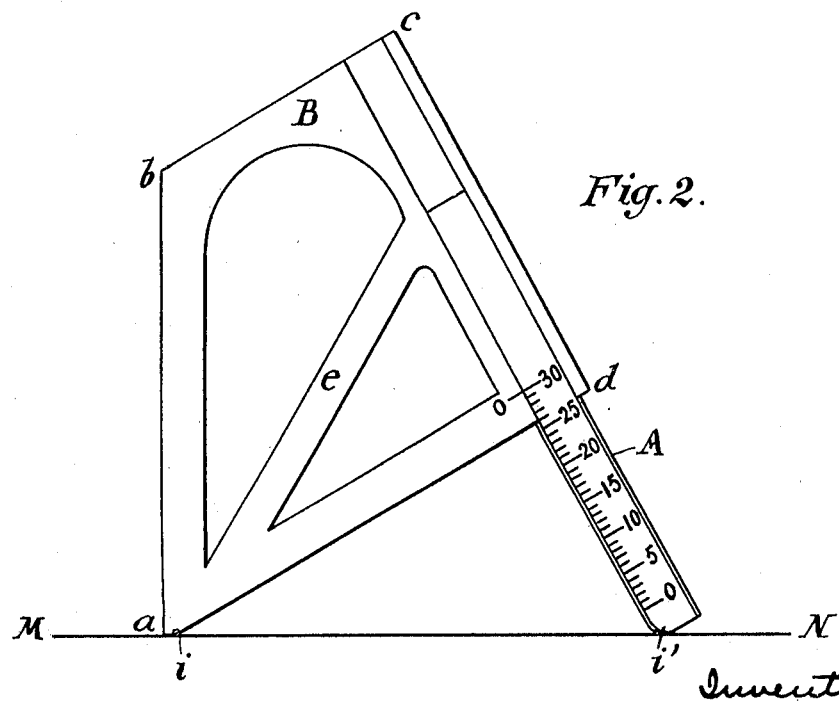
Witnesses:—
E. A. Pell
M. A. Johnson.
Inventors:
Pierre Roch, and
Etienne Challet,
By Wm. H. Caufield, Atty.

UNITED STATES PATENT OFFICE.

PIERRE ROCH AND ETIENNE CHALLET, OF ROLLE, SWITZERLAND.

SET-OFF SQUARE.

980,340.  Specification of Letters Patent.  Patented Jan. 3, 1911.

Application filed May 10, 1910. Serial No. 560,441.

*To all whom it may concern:*

Be it known that we, PIERRE ROCH, manufacturer, and ETIENNE CHALLET, citizens of Switzerland, residing at Rolle, in the canton of Vaud, Switzerland, have invented certain new and useful Improvements in Set-Off Squares; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an instrument for measuring and setting off angles with precision, and for determining the degree of inclination which is assumed by different edges of the tool when it is tilted on one of its corners, and a removable scale is adjusted from the other edge of the tool to engage the surface on which the pivotal point is resting.

The invention is illustrated in the accompanying drawings, in which—

Figure 1 is a front view of the device resting flat on the surface on which it is placed, and Fig. 2 illustrates the device tilted to an angle of thirty degrees.

The frame is made up of a plate B which has the bottom end, its top end and one of its side edges formed at right-angles to each other, the remaining side being cut at an angle of sixty degrees to the base. Thus the line $a$—$b$ is arranged at an angle of sixty degrees to $a$—$d$, and the lines $b$—$c$ and $c$—$d$ are at right-angles. The frame is cut away to lighten it and to also form a supporting strip $e$, the edges of which are preferably arranged at an angle of thirty degrees to the base. The line M—N illustrates the surface on which the device is to be used. Arranged parallel with and adjacent to the perpendicular side edge is a way in which is adapted to slide the rule A. The frame adjacent to the slide and a slight distance from the bottom is provided with a mark indicated by O. The rule has graduations on its edge adjacent to the marked end of the way, these graduations being indicative of degrees, and the number of degrees to which the frame is tilted on the corner $i$ is indicated on the scale on the rule when the end $i'$ of the rule is also placed on the surface on which the device is resting. The angle thus indicated on the scale is the angle that the base of the frame bears to the surface on which the tool is resting, and the angles formed on the edges of the supporting strip $e$ and on the inclined side of the frame can easily be arrived at by a simple computation of adding thirty or sixty, respectively, to the number of degrees indicated on the rule.

The rule is preferably made longer than the height of the frame so that it presents a projecting end at all times, which end provides means for the manipulation of the rule. The point $i$ of the frame and the point $i'$ of the rule are preferably rounded so that they do not mar the surface on which the device is used, and when the same curvature is given to the points there will be no inaccuracies in the measure.

Of course it will be understood that we can vary the angles of the edges of the frame without departing from the scope of the invention, but we prefer to use the form illustrated in the drawings.

It will be understood that the graduations on the scale can be arranged to indicate degrees and also other subdivisions.

Having thus described our invention, what we claim is:—

1. A set off square comprising a frame having a bottom edge, a top edge, and a side edge arranged at right-angles to both the bottom edge and the top edge, the remaining side edge being inclined at an angle of sixty degrees to the base, and a rule adapted to slide on the frame and to have its bottom end slid within the frame, the rule being graduated to register, on the frame, the angle assumed by the base of the frame when the rule and the end of the base opposite the rule are resting on the surface operated upon.

2. A set off square comprising a frame having a base forming a straight edge, and a rule sliding on the frame and adapted to be projected from one end of the base and arranged to have its bottom end slid within the frame, the rule being graduated to indicate on a mark on the frame the angle the bottom assumes when the end of the rule and the end of the base opposite the rule are resting on a surface.

3. A set off square comprising a frame having a bottom forming a straight edge, one end of the bottom being rounded, and a rule arranged to have its bottom end within the frame and adapted to be projected from the base at the end opposite its rounded end, the frame having an indicating mark thereon and the rule having graduations adapted to be placed opposite the mark to indicate the number of degrees assumed by the base of the frame when the frame rests on its rounded end and on the projecting end of the rule, the end of the rule adapted to be projected from the frame being rounded.

4. A set off square comprising a frame having a bottom, a top and one side arranged to form straight edges, the aforesaid side being at right angles to the top and to the bottom, the remaining side being cut away to form a straight edge at an angle of sixty degrees to the base, the frame being cut away, a supporting strip projecting across the cut away portion and arranged at an angle of thirty degrees to the base, a rule arranged to slide parallel with and adjacent to the side that is perpendicular to the base, the frame and the rule being provided with coöperating graduations to indicate the angle assumed by the base when the rule is projected therefrom and the projecting end of the rule and the end of the base opposite the rule are both resting on the surface to which the inclination of the base of the square is desired.

In testimony, that we claim the foregoing, we have hereunto set our hands this twenty-seventh day of April 1910.

PIERRE ROCH.
ETIENNE CHALLET.

Witnesses:
L. H. MUNICE,
Q. SALLBERGER.